(12) United States Patent
Labuhn et al.

(10) Patent No.: US 6,622,810 B2
(45) Date of Patent: Sep. 23, 2003

(54) ADAPTIVE CRUISE CONTROL SYSTEM

(75) Inventors: Pamela Irene Labuhn, Shelby Township, Macomb County, MI (US); William Joseph Chundrlik, Jr., Rochester Hills, MI (US); Edward Harold Schmidt, deceased, late of Shelby Township, MI (US), by Geraldine F. Schmidt, legal representative

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/011,563

(22) Filed: Nov. 5, 2001

(65) Prior Publication Data

US 2003/0085066 A1 May 8, 2003

(51) Int. Cl.⁷ .................................................. B60T 7/16
(52) U.S. Cl. ........................ 180/169; 180/170; 701/96; 342/70
(58) Field of Search ............................... 180/167, 169, 180/170; 701/93, 96, 301; 340/903, 435, 436; 342/70, 455

(56) References Cited

U.S. PATENT DOCUMENTS

| | | | |
|---|---|---|---|
| 3,689,882 A | * 9/1972 | Desailly | 340/903 X |
| 4,703,429 A | * 10/1987 | Sakata | 701/96 |
| 4,706,195 A | * 11/1987 | Yoshino et al. | 701/96 |
| 5,014,200 A | 5/1991 | Chundrlik et al. | 364/426.04 |
| 5,173,859 A | 12/1992 | Deering | 364/426.01 |
| 5,375,060 A | 12/1994 | Nocker | 364/461 |
| 5,396,426 A | * 3/1995 | Hibino et al. | 701/96 |
| 5,454,442 A | 10/1995 | Labuhn et al. | 180/169 |
| 5,680,118 A | 10/1997 | Cusumano et al. | 340/903 |
| 5,749,426 A | * 5/1998 | Gilling | 180/167 |
| 5,934,399 A | 8/1999 | Iiboshi et al. | 180/169 |
| 5,938,714 A | 8/1999 | Satonaka | 701/96 |
| 6,009,368 A | 12/1999 | Labuhn et al. | 701/96 |
| 6,081,763 A | 6/2000 | Smith et al. | 701/93 |
| 6,311,121 B1 | * 10/2001 | Kuragaki et al. | 701/96 |

FOREIGN PATENT DOCUMENTS

EP 612641 * 8/1994

* cited by examiner

Primary Examiner—Brian L. Johnson
Assistant Examiner—Bryan Fischmann
(74) Attorney, Agent, or Firm—Laura C. Hargitt

(57) ABSTRACT

An adaptive cruise control system that provides a smooth following by limiting the headway to keep it lower than a predetermined maximum. The present invention accomplishes this objective through systematically limiting the headway. In particular, the present invention reduces a time related speed multiplier used in calculating the desired headway, to maintain a headway that is less than an effective maximum sensor range for the adaptive cruise control system.

23 Claims, 2 Drawing Sheets

ADAPTIVE CRUISE CONTROL SYSTEM

TECHNICAL FIELD

The present invention relates to vehicle speed control, and more particularly to headway limiting in adaptive cruise control for automotive vehicles.

BACKGROUND OF THE INVENTION

Automatic vehicle cruise control systems have been developed for maintaining the speed of a vehicle at a driver-selected speed. In conjunction with these known cruise systems, an adaptive cruise control system has been developed for detecting the presence of, and the distance to, a preceding vehicle and for adjusting the vehicle speed to maintain a following distance from the preceding vehicle when it is moving slower than the driver-selected speed. In essence, the source vehicle speed is controlled to the speed of the preceding vehicle with a speed dependent separation being maintained from the preceding vehicle, wherein the source vehicle speed is limited at a driver-selected speed.

Adaptive cruise control systems typically have conventional cruise control that may be overridden in certain circumstances by an adaptive vehicle speed control routine. The conventional cruise control, when activated, may include a control function designed to minimize a difference between the actual vehicle speed and a cruise-set speed, which is selected by the driver. The adaptive cruise control system adapts any active conventional control to the environment external to the controlled source vehicle by attempting to account for vehicles preceding the source vehicle within a speed dependent separation interval of the source vehicle and in the path of the source vehicle.

One form of adaptive control lies in the reduction of the cruise-set speed below the driver-selected speed by an amount determined and periodically updated to provide controlled following of sensed preceding vehicles traveling slower than the driver-selected speed. A speed command is generated, based in part, on the speed relationship between the source vehicle and the preceding vehicle. The cruise set speed is limited accordingly, to adapt the source vehicle speed to that of the preceding vehicle and provide a controlled following relationship.

Adaptive cruise control systems, such as the system described in U.S. Pat. No. 5,014,200, incorporated herein by reference and assigned to the assignee of the present invention, provides a speed dependent following distance that is adjustable by the driver. This adjustment affects a speed multiplier term used in the determination of the speed dependent following distance. For a fixed speed multiplier, the desired following distance should increase with increasing vehicle speed.

SUMMARY OF THE INVENTION

The present invention resides in an adaptive cruise control system that provides smooth adaptive cruise control following operation of a source vehicle by limiting the headway to keep it lower than a predetermined maximum. In the present invention, following distance limiting (headway limiting) allows the source vehicle to follow the preceding vehicle at the maximum distance or time interval that is predetermined to provide a smooth "non jerky" following operation. The system informs the driver of the source vehicle that the following distance and thus the amount of time or distance of headway is less than what the driver expected. The present invention accomplishes this objective through systematically limiting the headway. In particular, a time related speed dependent term used in calculating the desired headway is assigned prescribed limits, to maintain a headway that is less than a predetermined maximum headway that maintains the preceding source vehicle spacing within a preferred operational range for the adaptive cruise control system.

Limiting the headway accounts for the practical maximum range limitations of forward looking sensors and allows smooth adaptive cruise control following operation of the source vehicle, especially during high speed operation of the source and preceding vehicles without requiring the driver to adjust the speed dependent following distance. This operation is desirable due to the practical maximum range limitations of forward looking sensors used in adaptive cruise control systems, wherein the performance of the adaptive cruise control system can be less than optimal when the desired headway is near or beyond a maximum range for the system's sensor.

When no vehicle is detected to be in the path of die source vehicle, the adaptive cruise control system maintains or accelerates the source vehicle to the driver-selected speed. Conventional adaptive cruise control systems provide a speed dependent headway when a preceding vehicle moving slower than the driver-selected speed is encountered in the path of the source vehicle. Therefore, it is possible that the source vehicle will accelerate and decelerate, as the distance to the preceding vehicle moves into and out of the maximum sensor range resulting in a rough, "jerky" adaptive cruise condition. This occurs when the preceding vehicle is traveling slower than the driver-selected speed of the source vehicle but faster than a relatively high speed resulting in headway corresponding to or exceeding the maximum sensor range.

For a hypothetical example in a conventional adaptive cruise control system, with a driver-selected speed of 120 kph, a 100 meters maximum range system, and no preceding vehicle ahead, the source vehicle speed would be 120 kph. If the source vehicle approaches a preceding vehicle traveling at 110 kph, the source vehicle would be decelerated by the system when it approached within 100 meters of the preceding vehicle. This occurs to bring the source vehicle down to a speed of 110 kph. The actual distance between vehicles can be lower than the desired headway based on the driver's setting, by the time the source vehicle decelerates to 110 kph. The source vehicle then decelerates slightly to meet the desired headway. When the deceleration causes the distance to exceed the maximum sensor range, no preceding vehicle will be perceived and the source vehicle will accelerate back toward 120 kph. When the preceding vehicle comes within 100 meters again, the source vehicle would decelerate. Based on the situation, this cycle can be repeated and the adaptive cruise control system can result in a "jerky" cruise condition.

Therefore, the present invention limits the maximum headway when a source vehicle is operating in an adaptive cruise control system mode.

Other objects and features of the present invention will become apparent when viewed in light of the detailed description of the preferred embodiment when taken in conjunction with the attached drawings and appended claims.

BRIEF DESCRIPTION OF THE DRAWINGS

In order that the present invention may be well understood, there will now be described some embodiments thereof, given by way of example, with reference to the accompanying drawings, in which.

DESCRIPTION OF THE PREFERRED EMBODIMENT

Figure 1:
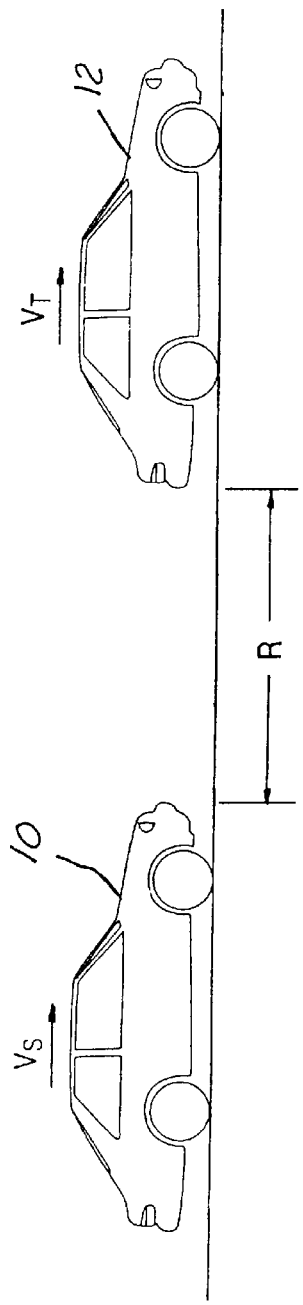
FIG. 1 is an illustration of the relationship between a source vehicle following a preceding vehicle.

FIG. 1 is a general diagram illustrating the relationship between a source vehicle 10, having the headway limiting adaptive cruise control system of the present invention, following a preceding vehicle 12 on a roadway surface. The source vehicle 10 has a speed $V_S$ and the preceding vehicle has a speed $V_T$. A distance R separates the source and preceding vehicles from each other.

Figure 2:
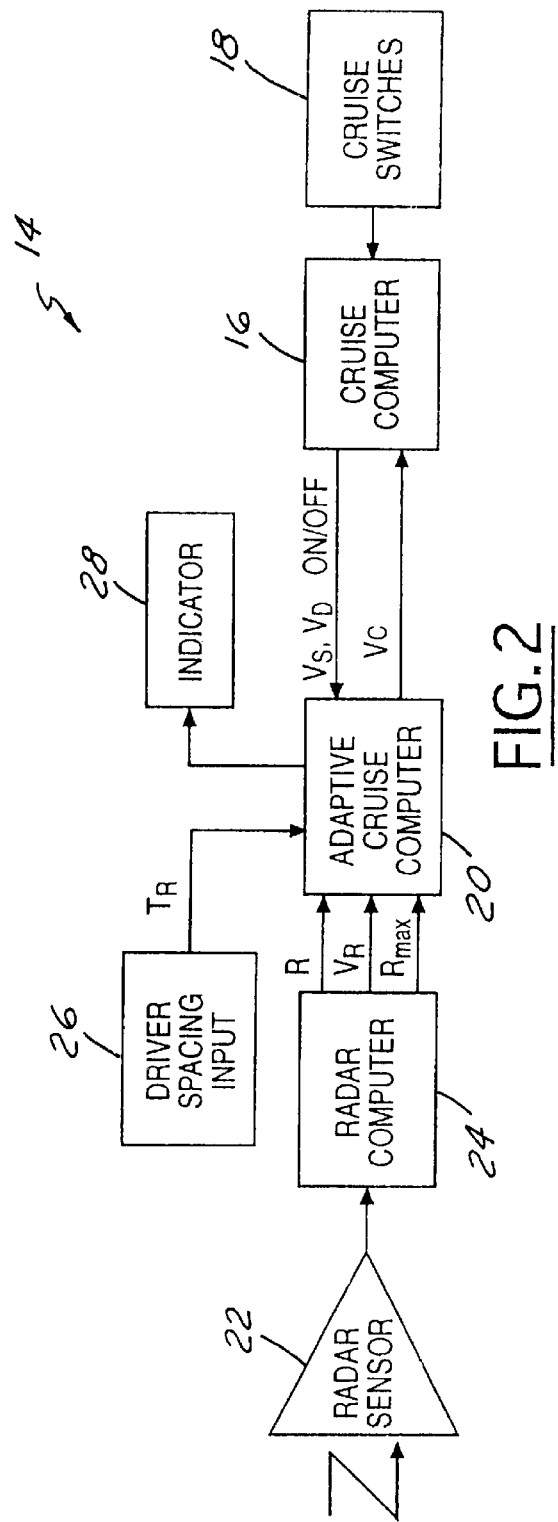
FIG. 2 is a block diagram of the headway limiting adaptive cruise control system of the present invention.

FIG. 2 is a block diagram of the speed dependent headway limiting adaptive cruise control system 14 of the present invention. Headway is a term used to describe the separation between the source and preceding vehicles. A cruise computer 16 is engaged by manual operation of conventional cruise switches 18 (for example, cruise switches typically include on/off, resume, and set switches). A signal that is sent from the cruise computer 16 to an adaptive cruise computer 20 indicates when the cruise control is engaged. The cruise computer 16 maintains the speed of the source vehicle at a command speed $V_C$. The command speed $V_C$ is provided to the cruise computer 16 by the adaptive cruise computer 20. In the absence of a preceding vehicle, the adaptive cruise computer 20 sets the command speed $V_C$ equal to a driver-selected speed, $V_D$.

When a preceding vehicle is present, data, including distance and speed information, is provided to the adaptive cruise computer 20 for calculating the command speed $V_C$. In the present example, a radar sensor 22 provides a measure of the distance, R, to the preceding vehicle and a relative velocity $V_R$ to a radar computer 24. The radar sensor 22 may take the form of a conventional radar that provides a measure of the distance to a preceding vehicle and the relative velocity between the radar sensor 22 and the preceding vehicle. While distance and relative velocity measurements are described as being provided by a radar sensor, other sensors, such as infrared sensors, that provide range and relative velocity may also be used.

When a preceding vehicle is traveling at a speed that is slower than the driver-selected speed, the adaptive cruise computer 20 computes the command speed $V_C$ to be less than the driver-selected speed. Then, the adaptive cruise computer 20 sends $V_C$ to the cruise computer 16, for controlling the speed of the source vehicle while cruise control is engaged.

The radar computer 24 extracts the distance R and the relative speed $V_R$ between the source and preceding vehicles, then sends this information, along with an effective maximum sensor range, $R_{max}$ to the adaptive cruise computer. The adaptive cruise computer 20 also receives the actual speed of the source vehicle, $V_S$, and the driver-selected speed, $V_D$ from the cruise computer 16.

The adaptive cruise computer 20 uses the inputs discussed above to determine the command speed, $V_C$, necessary for the source vehicle to attain and then maintain a desired headway, $D_{FOLLOW}$, behind the preceding vehicle. U.S. Pat. No. 5,014,200, which is incorporated herein by reference, describes in detail how the command speed, $V_C$, is computed using a proportional control equation:

$$V_C = K_P(R - D_{DESIRED}) + V_T,$$

where $K_P$ is a proportional constant and $D_{DESIRED}$ is a desired distance given by:

$$D_{DESIRED} = f(T_{HWC}, V_T, V_S)$$

which includes a speed dependent term, $T_{HWC}*V_S$, where $T_{HWC}$ is a time related speed multiplier.

More specifically, $$D_{DESIRED} = (V_S^2/K1) - (V_T^2/K1) + T_{HWC}*V_S$$

where K1 is a constant of two times the deceleration rate of the vehicle. In a preferred embodiment, the deceleration rate is 5 m/s² resulting in K1=10 m/s².

The desired headway $D_{FOLLOW}$ is obtained from the desired distance, $D_{DESIRED}$, by setting the relative speed to zero, $V_R=0$, and the source vehicle speed to the speed of the preceding vehicle, $V_S=V_T$ in the desired distance equation. In the preferred embodiment, the resulting desired following distance is $D_{FOLLOW}=T_{HWC}*V_T$. In a system without maximum range limitations, the value of $T_{HWC}$ would be set to a driver-selected value, $T_R$, established by the vehicle operator from a driver spacing input 26 such as a potentiometer.

Figure 3:
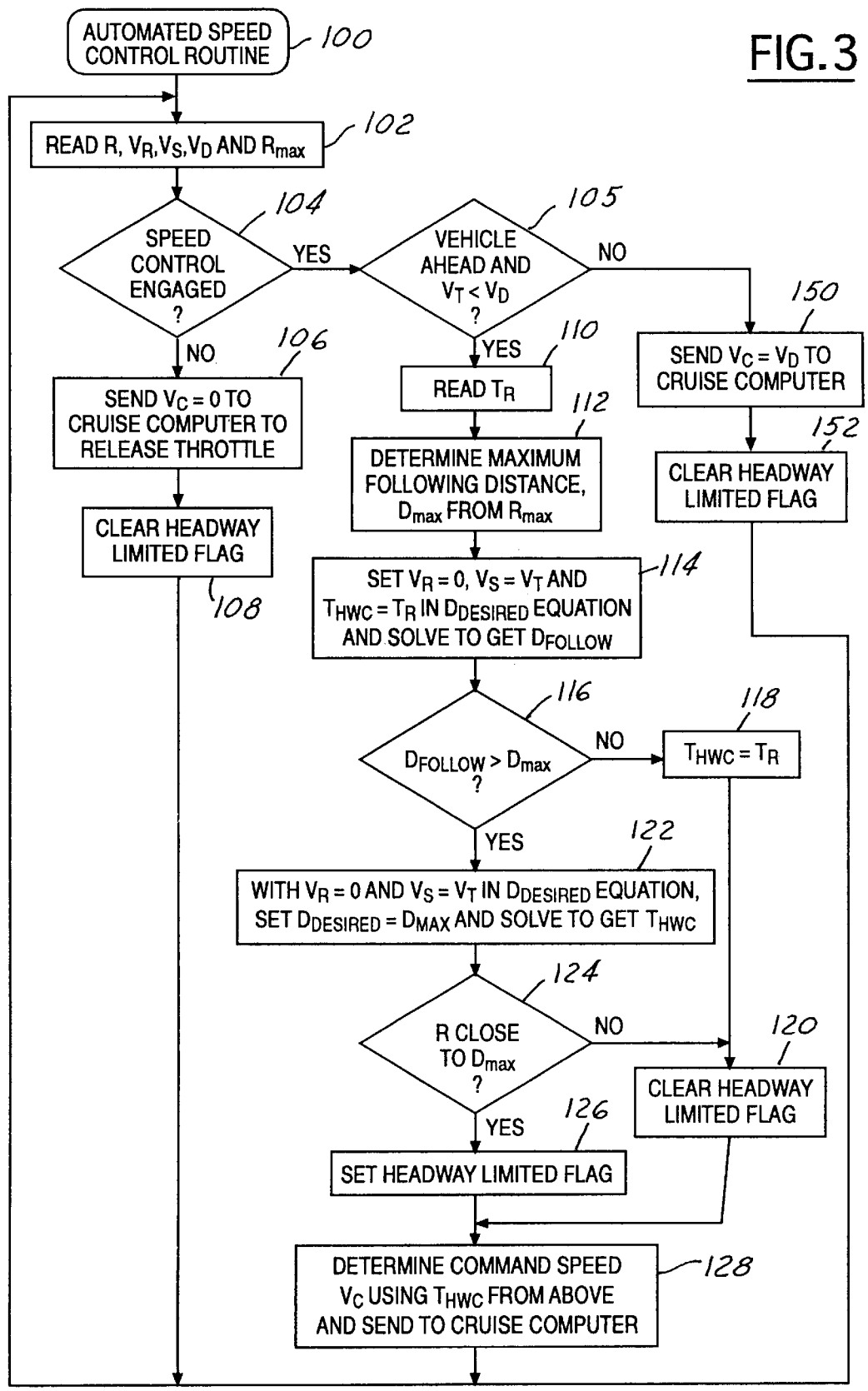
FIG. 3 is a flowchart of the headway limiting adaptive cruise control system of the present invention.

In accordance with the present invention, the speed dependent headway adaptive cruise control system limits the headway to keep it lower than the maximum range by substituting the limiting value of the time related speed multiplier $T_{HWC}$ in place of the driver-selected value of $T_R$. The automated speed control routine 100 of the present invention is shown in flow chart form in FIG. 3. The adaptive cruise computer extracts 102 the distance, R, relative speed, $V_R$, and the effective maximum sensor range, $R_{max}$ from the radar computer. The adaptive cruise computer also extracts 102 the source vehicle speed $V_S$ and the driver-selected speed $V_D$, from the cruise computer. The effective maximum sensor range, $R_{max}$, may be a calibratable constant in the adaptive cruise control computer, or it may be a variable that depends on the radar system's ability to predict the path of the source vehicle.

Next the routine 100 determines 104 if the cruise switches to the cruise computer have been set to engage the cruise control. When speed control is not engaged, the command speed, $V_C$, is set to zero and the cruise computer is instructed to release the throttle 106. A headway limited flag is then cleared 108.

When speed control is engaged, the routine next determines 105 if there is a preceding vehicle whose speed, $V_T$, is less than the driver-selected speed $V_D$. If there is no preceding vehicle or the preceding vehicle is traveling at a speed $V_T$ equal to or greater than the driver-selected speed $V_D$, the routine proceeds to step 150 where the command speed $V_C$ is set equal to the driver-selected speed $V_D$ and sent to the cruise computer. The headway limited flag is then cleared 152.

When speed control is engaged and there is a preceding vehicle whose speed $V_T$ is less than the driver-selected speed $V_D$, $T_R$ is taken from the driver-selected spacing input and read 110 into the adaptive cruise computer. The maximum headway, $D_{max}$, is determined 112 to be a value less than the effective maximum sensor range, $R_{max}$. $D_{max}$ must be less than $R_{max}$ to allow the system to compensate for variations in the preceding and source vehicle speeds, thereby avoiding control oscillations during following. For example, $D_{max}$ can be less than $R_{max}$ by a fixed distance or by a speed dependent distance.

The desired headway, $D_{FOLLOW}$, is calculated 114 by setting the relative speed to zero $V_R=0$, the source vehicle speed to the speed of the preceding vehicle $V_S=V_T$, and $T_{HWC}=T_R$ in the desired distance, $D_{DESIRED}$, equation. Once the desired headway, $D_{FOLLOW}$, has been calculated 114, it is compared 116 to the maximum headway $D_{max}$.

In circumstances where the desired headway is less than, or equal to, the maximum headway ($D_{FOLLOW} \leq D_{max}$), the time related speed multiplier, $T_{HWC}$ is set equal to the driver-selected value, $T_R$, 118. The headway limited flag is cleared 120.

In circumstances where the desired headway is greater than the maximum headway ($D_{FOLLOW} > D_{max}$), the relative speed $V_R$ is set to zero, the source vehicle speed $V_S$ is set equal to the preceding vehicle speed $V_T$. The desired distance equation is set equal to $D_{max}$ and then solved 122 for $T_{HWC}$.

Then the distance, R, to the preceding vehicle is compared 124 to the maximum headway, $D_{max}$. If R is close to $D_{max}$, the headway limited flag is set 126 when the headway is limited and substantially stabilized, otherwise the headway limited flag is cleared 120.

In any event, the command speed, $V_C$, is calculated 128 using the value of $T_{HWC}$ determined at either step 118 or 122, and sent to the cruise computer.

The method of the present invention is run at a periodic rate, e.g. every 100 msec, in order to update the control outputs such as command speed $V_C$, as the inputs change.

Referring again to FIG. 2, the headway limited flag can be used by the adaptive cruise computer to control an indicator 28 that is used to alert the driver that the source vehicle is following the preceding vehicle at a distance closer than expected based on the setting of the driver-selected value $T_R$. The indicator 28 could be a visual and/or audible device, such as a warning light, buzzer, tone, or the like. According to the present invention, the determination of the time related speed multiplier, $T_{HWC}$, based on the relationship between the desired headway and the predetermined maximum headway, limits the headway and keeps it lower than the predetermined maximum.

As a practical example, consider a source vehicle having a driver-selected speed of 120 kph, a driver-selected value $T_R$ of 2.0 seconds, and an effective maximum sensor range of 100 meters. When there is no preceding vehicle ahead, the source vehicle speed is 120 kph. When the source vehicle approaches a vehicle traveling 110 kph and comes within the maximum range of 100 meters, the maximum headway is limited, but the vehicle speed is not limited. The source vehicle then follows the preceding vehicle at 110 kph, at the predetermined maximum headway $D_{max}$ effectively reducing the actual speed dependent headway below the speed dependent headway set by the driver. In this case, the source vehicle follows the preceding vehicle at a distance of, for example, 90 meters, which is less than the effective maximum sensor range, $R_{max}$, effectively reducing the speed dependent headway from 2.0 seconds to 1.83 seconds. The indicator device 28 will inform the driver that the headway has been limited to a value less than the driver-selected value by the adaptive cruise control system.

With the present invention it is possible to account for the practical maximum range limitations associated with forward looking sensors used in prior art adaptive cruise control systems. With the adaptive cruise control system of the present invention a smoothly operated source vehicle follows a high-speed preceding vehicle without requiring the driver to adjust the driver spacing input.

While particular embodiments of the invention have been shown and described, numerous variations and alternate embodiments will occur to those skilled in the art. One such variation involves combining the functions of the adaptive cruise computer 20 and the cruise computer 16 such that the combined computer reads the cruise switches and determines the driver-selected speed. The combined computer would also provide a control command to an engine management system that controls the engine to achieve the commanded value. The control command is updated periodically by the combined computer to attain either the driver-selected speed or the headway depending on whether there is a preceding vehicle moving slower than the driver-selected speed. The control command can be a command speed $V_C$ as described previously, or some other control command such as acceleration. Accordingly, it is intended that the invention be limited only in terms of the appended claims.

We Claim:

1. An adaptive cruise control system for controlling a distance, R, between a source vehicle and a preceding vehicle, said system comprising:

a sensor for sensing said distance, R;

a signal representing a predetermined time, $T_R$;

means for determining a maximum headway, $D_{max}$;

means for determining a desired headway, $D_{FOLLOW}$ based on said predetermined time, $T_R$;

means for comparing $D_{FOLLOW}$ to $D_{max}$; and means for controlling said distance, R, to the smaller of said desired headway, $D_{FOLLOW}$ or said maximum headway, $D_{max}$, thereby defining a controlled distance.

2. The system as claimed in claim 1 wherein said maximum headway is a function of an effective maximum sensor range.

3. The system as claimed in claim 1 wherein said maximum headway is a fixed distance.

4. The system as claimed in claim 1 wherein said desired headway is a function of a speed of the preceding vehicle.

5. The system as claimed in claim 1 wherein said controlled distance is a function of a speed of the preceding vehicle and said means for controlling the distance R further comprises means for calculating a time related speed multiplier $T_{HWC}$.

6. The system as claimed in claim 5 wherein said means for calculating said time related speed multiplier, $T_{HWC}$ further comprises setting said time related speed multiplier, $T_{HWC}$, equal to said predetermined time, $T_R$, when said desired headway is less than or equal to said maximum headway.

7. The system as claimed in claim 5 wherein said time related speed multiplier, $T_{HWC}$, is a function of said maximum headway, $D_{max}$, when said desired headway, $D_{FOLLOW}$, is greater than said maximum headway, $D_{max}$.

8. A method for limiting a following distance between a source vehicle and a preceeding vehicle in an adaptive cruise control system, said method comprising the steps of:

relaying an actual source vehicle speed, a relative distance, a relative velocity, between the actual source vehicle speed and a preceeding vehicle speed, a desired source vehicle speed, a time related speed multiplier, and a maximum system range to an adaptive cruise computer;

determining a predetermined maximum headway;

calculating a desired headway by solving a desired distance equation;

limiting said time related speed multiplier;

setting a headway limited flag when said relative distance approaches said predetermined maximum headway;

determining a source vehicle command speed based on said limited time related speed multiplier;

limiting the following distance to be less than said predetermined maximum headway; and controlling said desired source vehicle speed to said source vehicle command speed.

9. The method as claimed in claim 8 wherein said step of limiting the following distance further comprises setting said time related speed multiplier to a pre-set driver input when said desired headway is less than or equal to said maximum headway.

10. The method as claimed in claim 8 wherein said step of limiting the following distance further comprises calculating said time related speed multiplier by setting said relative velocity equal to zero, setting said desired source vehicle speed equal to said preceding vehicle speed and solving said desired distance equation.

11. The method as claimed in claim S wherein said step of setting a headway limited flag further comprises the step of activating an indicator.

12. The method as claimed in claim 8 wherein said step of calculating a desired headway further comprises the steps of:

setting said relative velocity equal to zero;

setting said source vehicle speed equal to said preceding vehicle speed; and setting said time related speed multiplier equal to a value pre-set by an operator of said source vehicle.

13. A method of controlling the headway between a preceding vehicle and a source vehicle operating at a controlled speed comprising the steps of:

determining a maximum headway between the preceding vehicle and the source vehicle;

calculating a desired headway between the preceding vehicle and the source vehicle;

comparing the desired headway to the maximum headway; and when the desired headway is greater than the maximum headway, setting the controlled speed to result in a limited headway at which the source vehicle follows the preceding vehicle wherein the limited headway is less than the desired headway.

14. The method as claimed in claim 13 wherein the step of determining the maximum headway involves determining lit maximum headway based on an effective maximum range of a sensor on the source vehicle that senses distance from the preceding vehicle to the source vehicle wherein the maximum headway is less than the effective maximum range.

15. The method as claimed in claim 13 wherein the step of calculating the desired headway is effected as a function of a driver spacing input setting manually selected in the source vehicle.

16. The method as claimed in claim 13 wherein when the maximum headway is greater than the desired headway, the headway at which the source vehicle follows the preceding vehicle is controlled to the desired headway.

17. The method as claimed in claim 13 wherein the desired headway is determined based on the speed of the source vehicle and wherein when the speed of the source vehicle increases, the desired headway increases.

18. A method of controlling the headway between a preceding vehicle and a source vehicle operating at a controlled speed comprising the steps of:

reading input of a sensor to determine an actual headway spacing between the source vehicle and the preceding vehicle;

determining a maximum headway spacing between the source vehicle and the preceding vehicle as a function of a maximum effective range of the sensor;

reading driver spacing input from a manually adjustable unit;

determining a following headway spacing between the preceding vehicle and the source vehicle as a function of the driver spacing input;

comparing the following headway spacing to the maximum headway spacing; and when the following headway spacing is greater than the maximum headway spacing, setting the controlled speed of the source vehicle to effect a limited headway spacing between the preceding vehicle and the source vehicle that is less than the following headway spacing.

19. The method as claimed in claim 18 wherein the limited headway spacing is effected by calculating a variable $T_{HWC}$ as a function of speed of the source vehicle and substituting the variable $T_{HWC}$ for the driver spacing input and calculating the controlled speed of the source vehicle as a function of $T_{HWC}$.

20. The method as claimed in claim 18 wherein the maximum headway spacing is a constant.

21. The method as claimed in claim 18 wherein when the following headway spacing is less than the maximum headway spacing the controlled speed of the source vehicle is calculated as a function of the driver spacing input.

22. The method as claimed in claim 18 wherein when the limited headway spacing is effected, a headway limited indicator in the source vehicle is turned on.

23. The method as claimed in claim 18 wherein the steps are repeated at predetermined time intervals.

* * * * *